3,020,201
l-ARGININE-l-GLUTAMATE INTRAVENOUS THERAPY OF HEPATIC COMA AMMONIA INTOXICATION
Arnold E. Osterberg, Waukegan, Ill., assignor to Abbott Laboratories, North Chicago, Ill., a corporation of Illinois
No Drawing. Filed Nov. 28, 1958, Ser. No. 776,733
2 Claims. (Cl. 167—65)

This invention relates to a method of combating ammonia intoxication occurring during coma associated with hepatic disease.

Heretofore, in the treatment of the patient's suffering from ammonia intoxication occurring during coma associated with hepatic disease, it has been common practice to administer glutamic acid in the form of its sodium salt or potassium salt. To a lesser extent, arginine hydrochloride has also been used in the treatment of hepatic coma. The prior art practice, however, has not been entirely satisfactory because the sodium or potassium salt of glutamic acid tends to cause harmful alkalosis and the arginine hydrochloride tends to induce hyperchloremia.

It is therefore an object of the present invention to provide an improved method of treating ammonia intoxication occurring during coma associated with hepatic disease which avoids inducing excessive alkalosis or hyperchloremia in the patient.

Other objects will be apparent to those skilled in the art from the detailed description and claims to follow.

It has been found that the salt formed when equimolar proportions of glutamic acid and arginine are combined has markedly superior properties to sodium or potassium glutamate and to arginine hydrochloride for the treatment of hepatic coma. The said salt of the two amino acids has improved action against ammonia intoxication without the objectionable features of inducing alkalosis or hyperchloremia.

In accordance with the preferred embodiment of the present invention, the salt l-arginine-l-glutamate is prepared as a 25% w./v. solution in water for injection with each 100 cc. of the solution comprising 13.5 grams of arginine and 11.5 grams of glutamic acid. Prior to use, 100 cc. of the said 25% w./v. solution is diluted as desired with a 5% dextrose aqueous solution. Generally about 500 cc. of the said dextrose solution is used, but smaller amounts of the dextrose solution can be used where it is desired to restrict the amount of water infused. The said solution of l-arginine-l-glutamate salt diluted with the dextrose solution in the above manner is administered by intravenous infusion over a period of generally about one to two hours, but the rate of administration will usually depend on the condition of the patient. It is standard procedure to administer the said l-arginine-l-glutamate salt in an amount between about 25 and 50 mg. as the initial dose, and repeating the dose after eight hours if blood ammonia levels are still elevated or if coma persists. Severe cases may require repeated infusions for a period of from three to five days.

The salt of l-arginine-l-glutamate is prepared by mixing l-arginine (13.5 grams) and l-glutamic acid (11.5 grams) in water and crystallizing the resulting salt l-arginine-l-glutamic acid from the solution with methanol and cooling.

Others may readily adapt the invention for use under various conditions of service, by employing one or more of the novel features disclosed or equivalents thereof. As at present advised with respect to the apparent scope of my invention, I desire to claim the following subject matter.

I claim:
1. A method of combating ammonia intoxication occuring during hepatic coma which comprises administering to a patient having elevated ammonia blood levels associated with hepatic coma a solution of l-arginine-l-glutamate by intravenous infusion.
2. A method of combating ammonia intoxication as in claim 1 wherein the amount of l-arginine-l-glutamate administered to a human patient within an eight-hour period is between about 25 and 50 mg. l-arginine-l-glutamate.

References Cited in the file of this patent

Gullino et al.: Archives of Biochemistry and Biophysics, vol. 76, pp. 430–438, August 1958.